March 4, 1969 J. E. POWELL 3,430,328
METHODS AND APPARATUS FOR TREATING GLASS SHEETS
Filed Aug. 19, 1965 Sheet 5 of 8
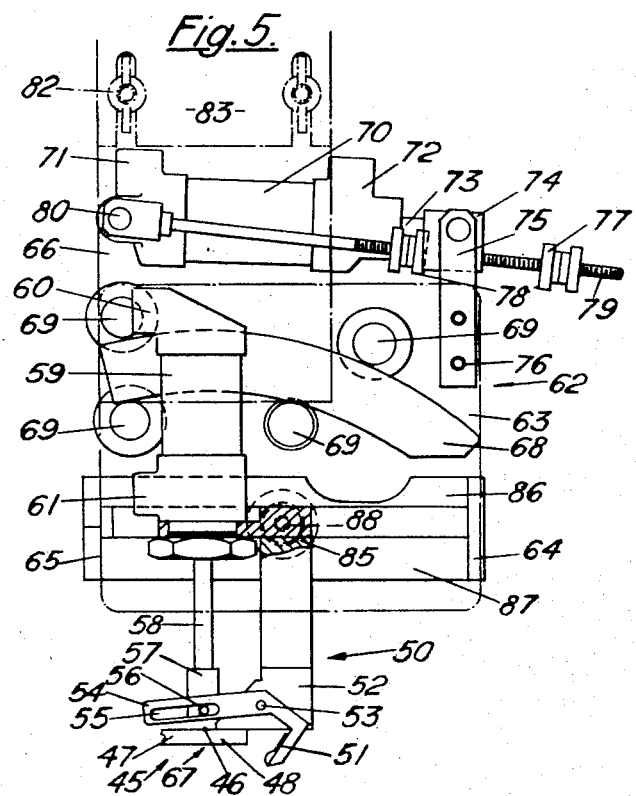
Inventor
John Ernest Powell
By
Morrison, Kennedy & Campbell
Attorneys

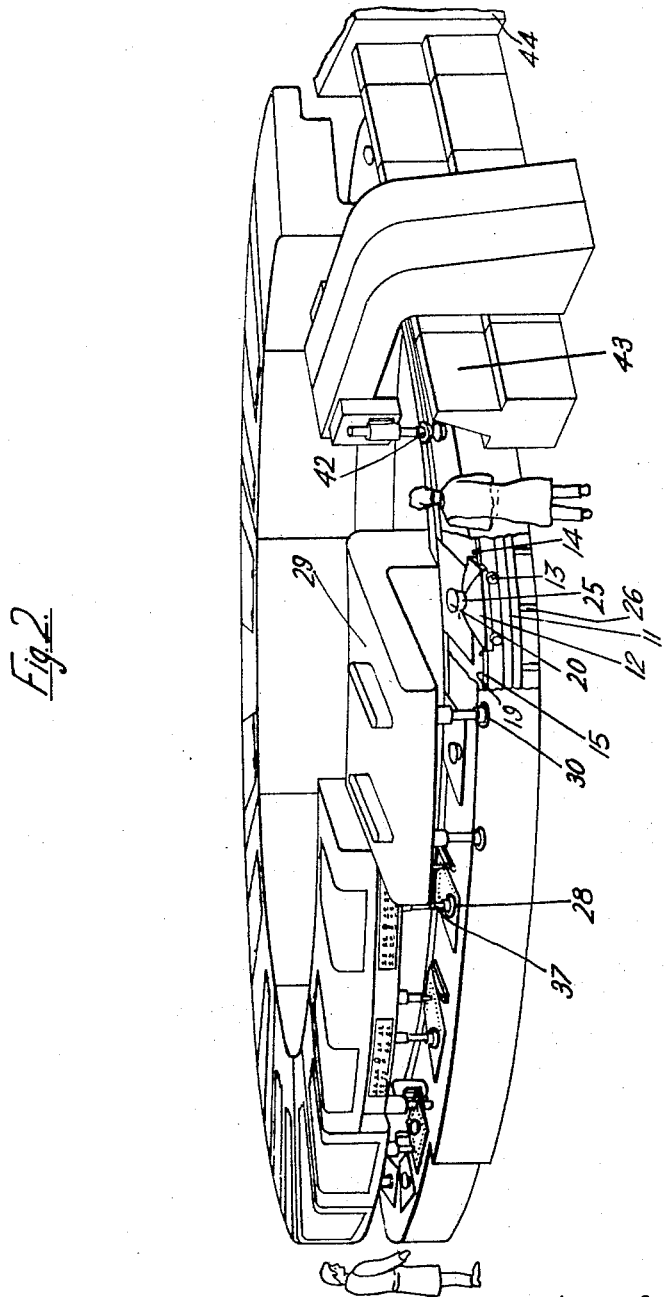

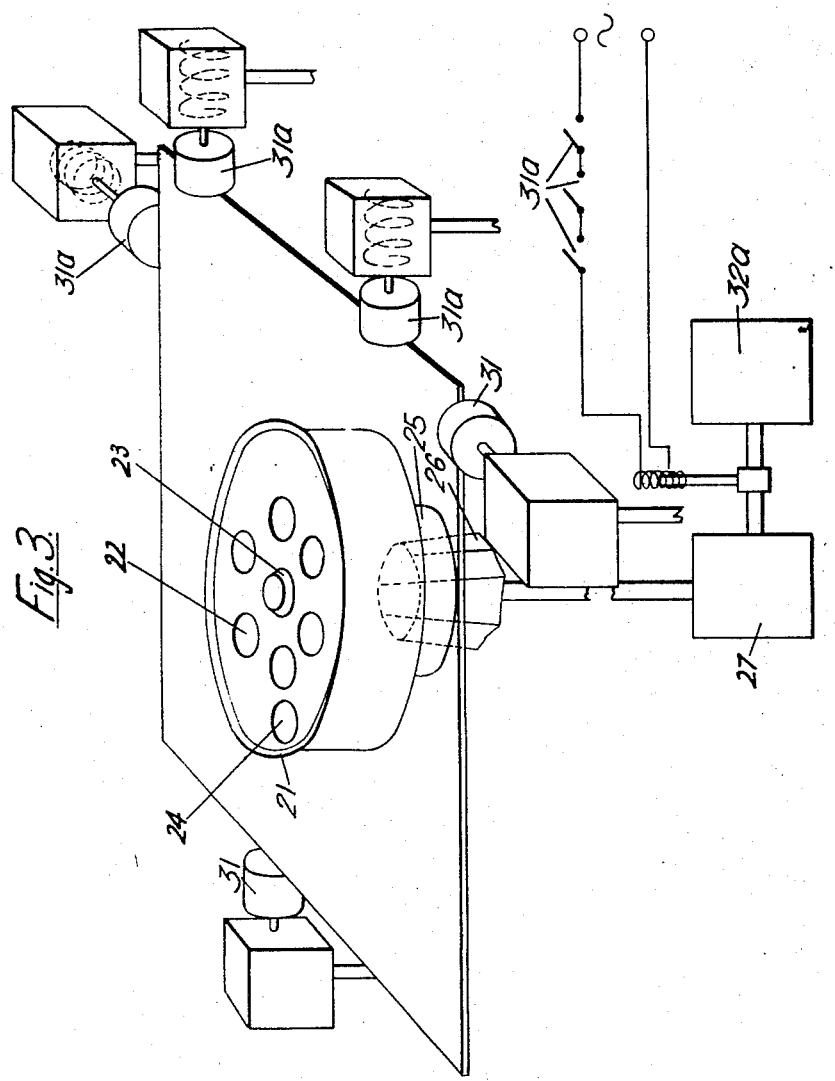

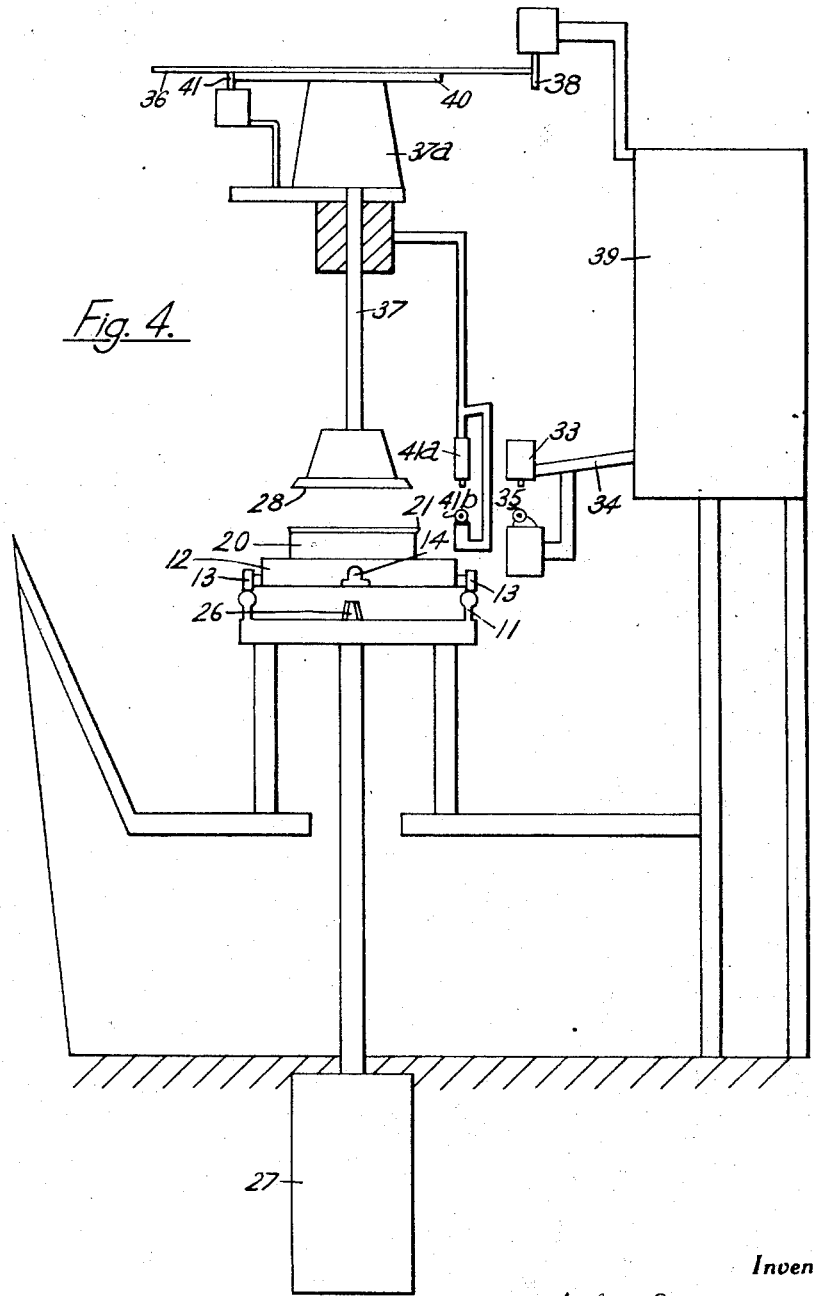

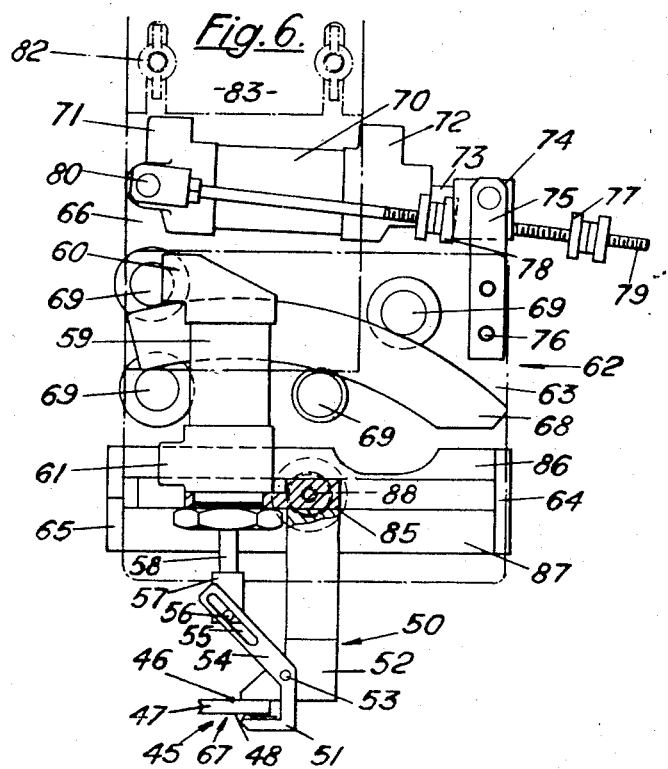

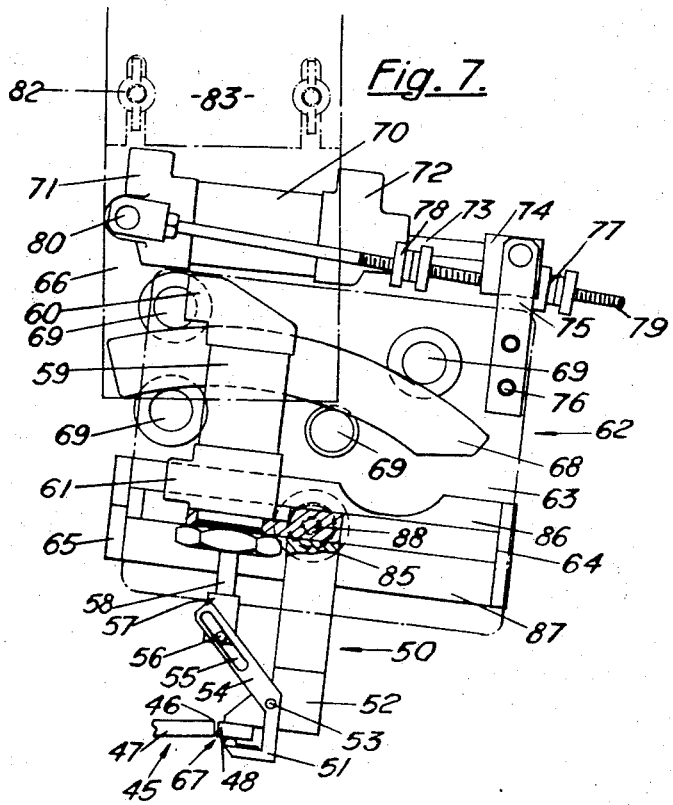
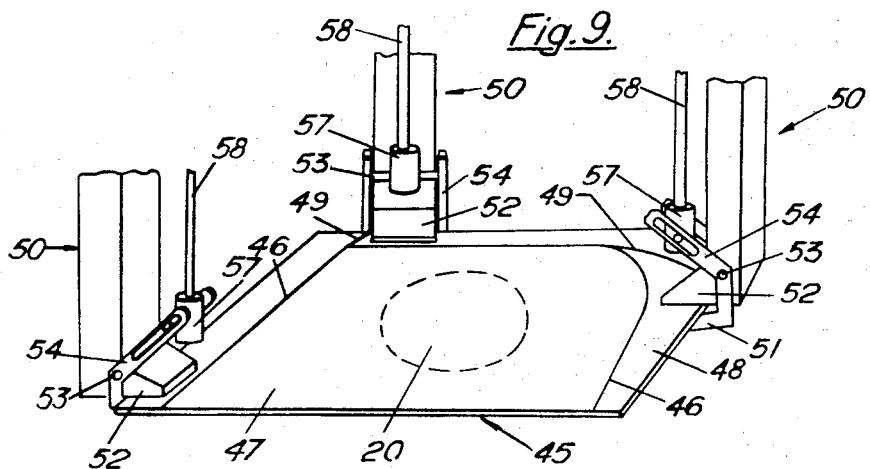

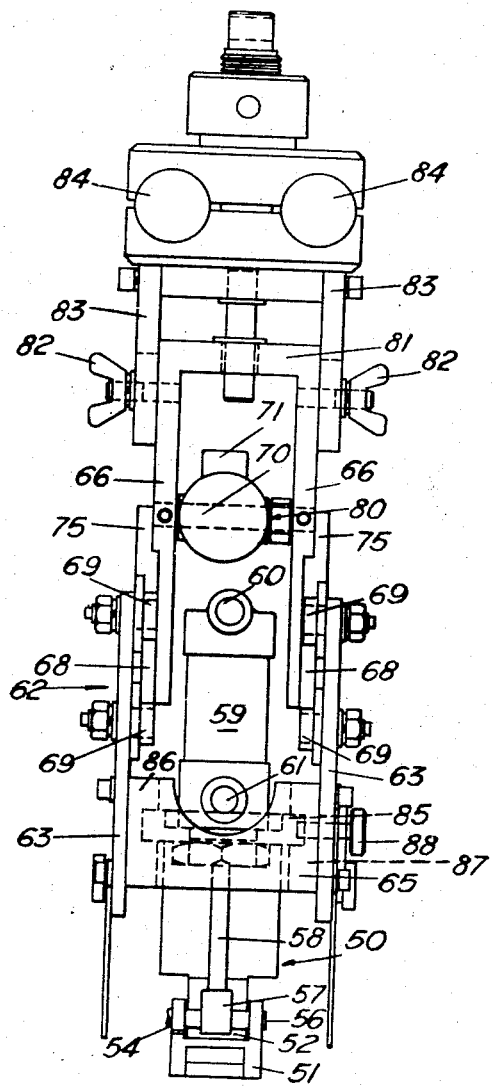

United States Patent Office 3,430,328
Patented Mar. 4, 1969

3,430,328
METHODS AND APPARATUS FOR TREATING GLASS SHEETS
John Ernest Powell, Birmingham, England, assignor to Triplex Safety Glass Company Limited, London, England, a corporation of Great Britain
Filed Aug. 19, 1965, Ser. No. 480,942
Claims priority, application Great Britain, Aug. 19, 1964, 33,937/64
U.S. Cl. 29—407
Int. Cl. B23p 19/04, 17/00; B23q 17/00
16 Claims

ABSTRACT OF THE DISCLOSURE

A method of conveying glass sheets to and away from a series of equispaced operating stations set up in a circular path, comprising the steps of securing each glass sheet by suction on one chassis of a series in fixed spaced relation and running on a circular track through the stations, advancing the chassis in a regular step by step movement to present each sheet to be operated on at the respective station, precisely setting each sheet on its chassis by vertical displacement into a horizontal plane related to the respective operating tool for completion of the allotted operation.

---

Figure 1:
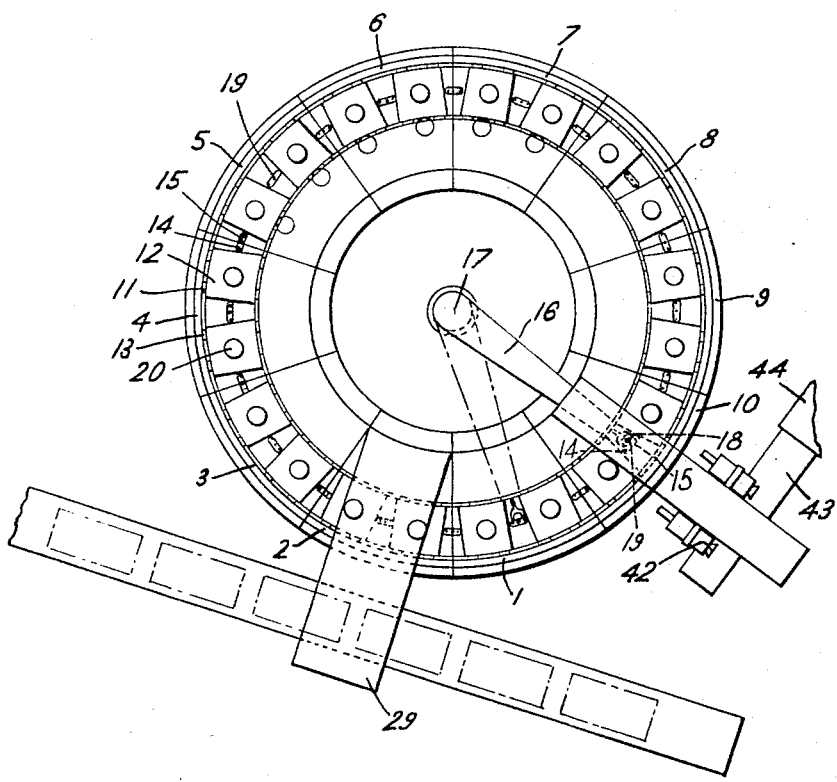

This invention relates to methods and apparatus for treating glass sheets and more particularly to a method in which a glass sheet of a particular desired shape is produced by cutting a parent sheet of glass and, if a particular finish is required, edge-working the shaped sheet.

One particular application in which it is desired to produce in large quantities glass sheets of particular shapes ready for a subsequent process is for glasses to form glazing, for example, doorlights for automobiles and it is a main object of the present invention to provide a method and apparatus for producing such glass sheets by an automatic process.

According to the present invention there is provided a method of operating on glass, for example cutting glass, to produce glass sheets of desired shape from respective parent sheets of glass comprising the steps of securing each sheet of glass in a desired position ready for advancement, advancing each glass sheet through a series of operating stations in a step by step motion so that the glass sheet remains at each station for the respective operation to be effected, locating the sheet of glass in an operating position, and performing the alloted operation on the glass while the glass is maintained in said operating position at each station.

Glass sheets cut by the method of the present invention to be used as vehicle glazing need to undergo finishing operations and according to this aspect of the present invention there is provided a method for operating on glass, for example cutting and edge working glass to produce glass sheets of desired shape from respective parent sheets of glass, comprising the steps of securing each sheet of glass in a desired position ready for advancement, advancing each glass sheet through a series of operating stations in a step by step motion so that the glass sheet remains at each station for the respective operation to be effected, locating the sheet of glass in an operating position wherein the glass is maintained while the glass remains at each station, and performing the allotted operation on the glass at each station.

More particularly according to the present invention there is provided a method for operating on glass, for example cutting and edge working glass to produce glass sheets of desired shape and finish from respective parent sheets of glass, comprising the steps of securing each sheet of glass by suction in a desired position on a carrier ready for advancement, advancing each carrier with the glass sheet in the secured position through a series of operating stations in a step by step motion so that the glass sheet remains at each station for the respective operation to be effected, locating the carrier and the glass sheet in an operating position wherein the glass is maintained while the glass remains at each station, and performing the allotted operation on the glass at each station.

Preferably the locating of the sheet of glass at each station is effected by raising the carrier and the glass sheet to the operating position in which the sheet of glass is precisely presented for the allotted operation to be performed on the glass at that station.

The present invention further provides a method of operating on glass to produce glass sheets of desired shape from respective parent sheets of glass comprising the steps of locating a parent sheet of glass in a desired position ready for advancing by maneuvering the parent sheet of glass into engagement with a set of positioning members which uniquely determine the precise position of the sheet of glass on a platen, securing the sheet of glass in the uniquely determined position on the platen by the application of suction through the platen, advancing the platen carrying the sheet of glass secured thereto through a series of operating stations in a step by step motion so that the glass sheet remains at each station for the respective operation to be effected, utilising a locating member to raise the platen at each station so that the platen and the glass sheet secured thereto are brought to a precise operating position, and performing the allotted operation on the glass while the glass is maintained in said precise operating position at each station.

Advantageously the carrier and the glass are rotated in the operating position at scoring and edge finishing stations, and the respective operations are performed on the glass whilst the glass is being rotated.

The parent glass sheet will be, in general, a rectangular sheet of glass and during the sequential operations the glass sheet will be scored by a cutting tool to mark the desired outline for the glass sheet for the automobile glazing, for example, a doorlight. After the glass sheet has been scored it is broken out, and then the edge may be formed with an arris and then subjected to subsequent grinding operations and the glass sheet may be drilled to form holes for example for fixing attachments to the doorlight.

Desirably, when the parent glass sheet is scored at one station in accordance with the present invention a cutting or scoring tool marks the outline of the final glass sheet and the surface of the glass opposite to the surface which is scored is supported directly opposite said cutting or scoring tool during the scoring of the glass to prevent flexing of the glass under pressure exerted by the cutting or scoring tool.

Advantageously the marginal area of the parent glass sheet is additionally scored and supported at said one station to provide a curved fly cut on said marginal area.

Conveniently at the loading station the glass is manoeuvred to said desired position for securing by a plurality of movable fingers acting on the parent glass sheet to move it into engagement with a plurality of spring-loaded fingers.

The present invention also comprehends apparatus for conveying glass sheets through a closed series of treating stations, characterised by a series of chassis arranged in a path through said closed series of treating stations, the series of chassis carrying at least one abutment, and actuating means for engaging an abutment to actuate the individual chassis step by step through the stations.

The present invention further comprehends apparatus for conveying glass sheets through a closed series of treating stations arranged in a common circle, characterised by a series of chassis, an operating axis member coincident with the axis of the said common circle, a series of abutments carried by the series of chassis, a movable index arm mounted on the axis member for angular displacement thereon, said index arm having an effective length to engage the said abutments to actuate the individual chassis step by step through the successive stations, and a circular track for the chassis permitting limited movement of the chassis around said common circle under control of said index arm.

More particularly according to this aspect the present invention comprehends apparatus for conveying glass sheets through a closed series of equidistant treating stations arranged in a common circle characterised by a conveyor comprising an endless series of chassis articulated together on vertical axes arranged equidistant from an operating axis member coincident with the axis of the said common circle, a movable index arm mounted on the axis member for angular displacement thereon, individual abutments carried by each chassis at the leading end of each chassis, said index arm having an effective length to engage the said abutments to actuate the conveyor step by step through the successive stations, a circular track for the chassis permitting limited radial movement of the chassis, and rigid connections between the adjacent chassis holding the conveyor in the desired path of movement on the track.

The actual location of the glass in a desired position at each treating station is preferably accomplished by employing a carrier supported by the chassis and a centering cone at each treating station for raising the carrier and the glass at said station into a precisely located position for presenting the glass to the operating tool at said station.

Preferably the glass sheet, secured by a vacuum, is clamped at a treating station during the operation on the glass. The clamping of the glass sheet is particularly desirable when the operation on the glass involves the application of a force in the plane of the glass as in a grinding operation. An upper clamping member is then provided to clamp the glass to its carrier in the located position and this clamping member is conveniently arranged to rotate the carrier at scoring and edge finishing stations during the operations performed at those stations.

The present invention also provides apparatus for conveying glass sheets through a closed series of treating stations arranged in a common circle, characterised by a series of chassis, an operating axis member coincident with the axis of the said common circle, a series of abutments carried by the series of chassis, a movable index arm mounted on the axis member for angular displacement thereon, said index arm having an effective length to engage the said abutments to actuate the individual chassis step by step through the successive stations, a circular track for the chassis permitting movement of the chassis around said common circle under control of said index arm, platens carried respectively by said chassis, a locating member at each station arranged to lift a platen from a chassis to a precise operating position, a set of positioning members at a loading station for manoeuvring a sheet of glass into a uniquely determined position on the platen located in said precise operating position, and vacuum applying means connected to said platen at the loading station for applying suction to retain the glass sheet in said uniquely determined position on the platen ready for advancement in said uniquely determined position on the platen, when the chassis are advanced in said step by step movement through the successive stations.

Desirably in accordance with the invention the apparatus at one station comprises an arm holding a scoring tool and a rotatable support for supporting the glass disposed directly under the scoring tool to avoid flexing of the glass under the pressure exerted by the scoring tool.

Advantageously at said one station which is the scoring or cutting station there is provided an auxiliary scoring tool and rotatable support located near said scoring tool and operable during a part only of the treatment at said one station.

At other treating stations following the cutting station the glass is broken out and its edges may be subsequently ground and the glass sheet itself may be drilled.

Conveniently at a loading station there are provided a plurality of movable fingers for operating on a part of the edge of a glass sheet, and a further plurality of fingers resiliently mounted in a fixed position for engaging other parts of the edge of the glass sheet, whereby the parent glass sheet may be manoeuvred to a desired position on a chassis at said loading station.

The present invention also comprehends a shaped glass sheet when prepared by the method and/or apparatus of the present invention.

In order that the invention may be clearly understood, a preferred embodiment in accordance therewith will now be described by way of example with reference to the accompanying drawings in which:

FIGURE 1 is a diagrammatic plan view of an installation incorporating the apparatus in accordance with the invention, FIGURE 2 is a perspective view of the installation shown in FIGURE 1, FIGURE 3 is a perspective view of a glass sheet secured in a desired position at the loading station, FIGURE 4 is a diagrammatic elevation of one operating station of the installation, FIGURE 5 is a side elevation of the apparatus for breaking out scored glass presented thereto at one station of the installation, FIGURE 6 is a similar view showing the sheet of glass gripped by the jaws of the apparatus of FIGURE 5, FIGURE 7 shows the apparatus of FIGURE 5 operated to break out the glass within the scoreline to free the sheet from the marginal portions outside the scoreline, FIGURE 8 is an end elevation of the apparatus of FIGURE 5, and FIGURE 9 is a diagrammatic view of a supported sheet of glass being broken out by three of the apparatus of FIGURE 5.

In the drawings the same reference numerals designate the same or similar parts.

Referring now to FIGURES 1 to 4 of the drawings there is shown apparatus for conveying glass sheets through a closed series of ten equidistant operating stations 1 to 10 arranged in a common circle. Station 1 is an idle station but at the other stations 2 to 10 various operations are performed on a glass sheet as will be hereinafter described. Through the work stations runs a circular track 11 on which run twenty chassis comprising carriages 12 running on nylon wheels 13, articulated together by vertical pins 14, and rigid steel links 15 so that at any one time two carriages 12 are present in any one work station and simultaneous and similar operations are performed on two glass sheets supported by the two carriages at each work station. The rigid steel links 15 between adjacent chassis hold the circular arrangement of chassis in the desired path of movement on the track.

The carriages 12 are moved around the track by a movable index arm 16 pivoted on an axis member 17 coincident with the axis of the said common circle the index arm being arranged for clockwise movement from the datum position as shown in FIGURE 1 through an angle of 36°, from which position it may be returned to the datum position in an anticlockwise movement. Mounted in the index arm is an extendable fork 18 which is arranged to engage a vertical pin 19 carried half-way along each rigid link 15 joining two chassis, thereafter moving clockwise through 36°. The fork 18 is then retracted and is returned to the datum position where the finger is again extended to grip the vertical pin on the next link presented to the fork 18.

Each chassis 12 carries a circular carrier, for example, a platen 20 having a peripheral flexible rubber flange 21 and a number of circular cork stops 22 mounted on the upper surface thereof for supporting a glass sheet. In the centre of the platen is a valve 23 which is capable of being depressed by the weight of a glass sheet and through which a vacuum may be applied when the valve is so depressed, and, on a diameter of the platen is a biased valve 24 by means of which a vacuum in the cavity formed when a sheet of glass is supported on the platen 20 may be released, as will be hereinafter described.

The underside of the platen 20 is formed with a boss 25 (FIGURE 3) for engagement by a splined centering cone 26 mounted below the track and the centering cone may be raised by actuating apparatus 27 to engage the platen 20 and lift it off its chassis. Similar splined centering cones are provided in pairs at each of the treating stations for raising the platen and the glass which is secured thereto by suction, into a precisely located position for presenting the glass to the operating tool. The splined cone 26 is arranged so that, when it engages in the boss 25 on a platen 20, the platen 20 is precisely centered underneath a rotatable upper plate 28 (FIGURE 4) which with the platen 20 may sandwich a sheet of glass when the platen 20 is moved upwardly by the splined cone 26 to present the sheet of glass to the upper plate 28.

The splined cone 26 is bored out centrally so that when it is inserted into the boss 25 vacuum may be applied through it to the space below the vacuum valve 23. The mating vacuum orifices on boss 25 and cone 26 are provided with self-sealing valves of known type (not shown) so that the vacuum remains when the cone 26 is withdrawn.

The apparatus further comprises loading apparatus 29 (FIGURE 2) comprising suction pads 30 for loading glass sheets, stacked adjacent to the loading apparatus 29, directly onto a platen 20 raised up from each of two carriages 12 in the loading station 2 by two splined cones 26.

At the loading station (FIGURE 3) horizontal fingers 31 and 31a are arranged around and pointing towards each platen 20. Each of the platens is located in position by raising the splined centering cone 26, parent glass sheets are deposited on them by suction pads 30, and the fingers 31 which are arranged to abut two adjacent edges of each glass sheet, thrust the glass sheet towards the other fingers 31a located on the remaining two sides of the glass sheet. These latter fingers 31a are spring-loaded, as shown in FIGURE 3. When the two fingers 31 have manoeuvred the glass sheet into a desired position against the compression of the spring loaded fingers 31a, actuating switches 32 are operated so that a vacuum is applied by a vacuum pump 32a through cone 26 and boss 25 to the platen 20 through the central valve 23 which has been depressed and opened by the weight of the glass sheet placed thereon, the peripheral flange 21 forming with the underside of the glass sheet a hermetic seal.

The hydraulic pressure oil operating each of the fingers 31 is cut off from that finger as a result of contact being made with the actuating switch 32 associated with the opposed spring-urged finger 31a. However, it is only when all three actuating switches 32 are operated that a vacuum valve 32b is opened to apply the vacuum from the source 32a to the splined cone 26.

When the vacuum is holding the glass down, the fingers 31 are retracted, and the platen and glass are lowered onto the carriage 12. The spring-urged fingers 31a then move forward breaking the contacts of switches 32 and closing the vacuum valve 32b between cone 26 and vacuum source 32a. If desired more than two fingers 31 or three fingers 31a may be used.

The next operating station is the "cutting" station 3 (FIGURE 4) and this station again comprises two splined cones, only one of which is shown, each of which is arranged to engage the boss 25 on the underside of each platen 20 carried on its respective chassis 12. A scoring tool 33 held by an arm 34 is arranged to engage and score to the desired shape the upper surface of a sheet of glass when clamped between a platen 20 and an upper plate 28. Disposed directly underneath the scoring tool 33 is a nylon ball castor 35 for supporting the glass to avoid flexing of the glass under the pressure exerted by the scoring tool so that the line is evenly scored on the glass. The scoring tool 33 is arranged to follow a predetermined path by means of a template 36 mounted on a shaft 37 of the upper plate 28, which axis is rotated with the upper plate by rotation means 37a. A stylus 38 bears against the template 36 and by means of guiding apparatus 39 determines the path of the scoring tool 33 so that the shape of the template 36 is accurately reproduced on the upper surface of a glass sheet by the scoring tool. The shaft 37 carries a further template 40 against the edge of which a second stylus or follower 41 bears to control the speed of rotation of the upper plate 28. The template 40 is so shaped that the speed of rotation of the upper plate 28 is at a minimum when the scoring tool 33 is rounding a corner or at maximum distance from the axis of rotation of the platen and at a maximum when the scoring tool 33 is following a straight line or at a minimum distance from the axis of rotation.

Conveniently at station 3 a scoring tool 41a is lowered to the glass at a point adjacent the main scoring tool for a short portion of the rotation so that it scores a line (a "fly-cut"), which is a circular arc, between the main scoreline and the edge of the glass at an appropriate place. Simultaneously a nylon ball castor 41b is raised to support the glass below the scoring head 41a. In this way a subsequent breaking out operation is facilitated.

The next station is the breaking out station 4 to which the chassis 12 are advanced by an arcuate movement through 36° of the index arm 16.

Referring now to FIGURES 5 to 9 of the drawings there is shown apparatus for breaking out a shaped sheet of glass 45, of a shape prescribed by scoreline 46, from the horizontal parent glass sheet 47, including a margin 48 outside the scoreline 46. Fly-cuts 49 (FIGURE 9) have been scored on the glass sheet to assist this breaking out operation.

Each apparatus at the breaking out station 4 in an installation according to the invention comprises a clamp indicated generally at 50 having cooperating jaws 51 and 52 between which the marginal portion 48 of the glass sheet 45 may be received, the jaw 52 being a relatively fixed jaw and the jaw 51 being movable about a pivot pin 53 carried by the fixed jaw 52. The movable jaw 51 is mounted at the end of two slotted arms 54 each having a longitudinal slot 55 to receive a cooperating pin 56 carried at the lower end 57 of a piston 58, the operation of which causes the movable jaw 51 to pivot about the pivot pin 53 as shown in FIGURE 6.

The upper end of the piston moves in an air cylinder 59 having air inlets 60 and 61. The air cylinder 59 is carried on a carriage shown generally at 62 comprising side walls 63 spaced apart by end walls 64 and 65.

The carriage 62 is mounted on vertical supports 66 and is arranged for arcuate movement thereon, transversely to the plane of the glass sheet 45 about an operating axis 67 outside the undersurface of the parent glass sheet 47 remote from the scoreline 46 and approximately opposite the scoreline. The carriage moves between two arcuate guides 68 mounted on the vertical supports 66 on which guides 68 the carriage 62 is located by two pairs of rollers 69 mounted on each of the side walls 63 of the carriage 62.

The vertical supports 66 carry a second air cylinder 70 having air inlets 71 and 72, the air cylinder 70 being arranged substantially at right angles to the air cylinder 59. The piston 73 of the cylinder 70 is fixed at its outer end to a block 74 pivoted between a pair of vertical supports 75 each of which is bolted by bolts 76 to the inner face of the side walls 63.

The arcuate movement of the carriage 62 along the guides 68 is limited by settable stops 77 and 78 spaced apart on an arm 79 which passes through the block 74, the arm 79 being pivoted at 80 at its other end to one of the vertical supports 66. Arcuate movement of the carriage 62 along the arcuate guides 68 is thus limited by the settable stops 77 and 78, the block 74 abutting the stops 77 and 78 at the ends of its movement. The block 74 and the arm 79 are both pivoted to allow the arcuate movement of the carriage about the axis 67 to occur.

The two vertical supports 66 are joined at their upper ends by a transverse member 81 (see FIGURE 8) and the entity as a whole is bolted by wing nuts 82 to an overhead support 83 which is displaceable along guides 84 in order to break out sheets of glass of different sizes.

The clamp 50 is formed with a slipper 85 movable between guides 86 and 87 carried by the side walls 63 of the carriage 62 so that the clamp 50 is settable within the carriage 62 using a screw 88 to lock it in position. By adjusting the clamp 50 margins of different widths may be broken off without the necessity of disturbing the apparatus as a whole.

The apparatus of FIGURES 5 to 9 forms the subject matter of my copending application No. 480,961 filed Aug. 19, 1965, now Patent No. 3,305,149.

At the next working station 5 apparatus is provided for arrissing the shaped glass transferred thereto from the breaking out station.

In the next two stations 6 and 7, the edges of the shaped glass are smoothed by rough grinders and smooth grinders of known kind as the glass, clamped between its platen 20 and upper plate 28, is rotated. The path followed by the grinders is determined by a template 36 mounted on the axis 37 of the upper plate 28 which rotates the glass sheet as described above with reference to the "cutting" station 3. The speed of rotation is controlled by template 40 and follower 41. Castors similar to those provided at the cutting station may be provided to support the marginal portions of the glass during the grinding operation.

The next two operating stations 8 and 9 are two drilling stations where glass sheets advanced thereto are presented to drills which drill the glass sheets at the places desired. At the drilling stations 8 and 9 the glass sheets are again clamped between their respective platens 20 and upper plates 28 by which they are located angularly as required in relation to the drills.

The glass sheets are then advanced to the transfer station 10 where underneath each chassis an arm (not shown) is provided for engaging the valve 24 in each platen 20 for releasing the vacuum which holds the glass to the platen so that the glass may be taken from the platen by suction pads 42 and transferred to a conveyor 43 which advances the glass sheets to a washing machine 44.

In use sheets of glass from which the desired product is to be made are stacked adjacent the loading apparatus 29, the suction pads of which transfer a glass sheet onto each platen of the two carriages at the loading station. By way of example the following sequence of operations will be described to illustrate the manner in which vehicle glazing, for example, doorlights for automobiles, of desired shape and finish are cut from respective parent sheets of glass.

Each platen 20 in the loading station 1 onto which a glass sheet is to be loaded is engaged by its respective splined cone which raises the platen. The glass sheet is then deposited thereon by the suction pads 30, the weight of the glass sheet depressing the central valve 23.

The two fingers 31 abut edges of the glass sheet and advance the glass sheet towards the fingers 31a. When the glass sheet is in the correct position the actuating switches 32 on the fingers 31a are operated to open a vacuum line from the central valve 23 on the platen 20 through the splined cone 26 to the vacuum pump 32a so that a vacuum is applied to the cavity formed between the platen and the glass sheet and the glass sheet is secured by suction to the platen in the desired position ready for advancement. It will be appreciated that at subsequent stations the vacuum may be reapplied by means of similar splined cones 26 although this is not essential, since the self-sealing valves in the mating orifices of boss 25 and splined cone 26 should maintain the vacuum.

The splined cone 26 is then withdrawn from the boss 25 on the platen 20 by the actuating apparatus 27, the vacuum in the cavity being maintained by the self-sealing valves as the splined cone 26 is withdrawn, so that the glass sheet is secured in the desired position by suction to the platen through the closed series of operating stations. At the same time the fingers 31 and 31a are retracted outwardly and downwardly clear of the parent sheet of glass 47 to permit lowering of the glass and platen and subsequent movement of the chassis 12. The fork 18 on the indexing arm 16 then engages the vertical pin 19 on the rigid link 15 joining the two chassis 12 in the transfer station 10, moves clockwise with the arm 16 through an arc of 36°, retracts, and with the arm swings back to the datum position, so that the platen carrying the glass sheet and secured thereto by suction is moved into the "cutting" or scoring station.

Here another splined cone is raised to engage the boss 25 underneath the platen 20 and moves the platen upwardly to locate the glass sheet precisely in an operating position wherein the splined cone 26 is coaxial with the shaft 37 and the glass sheet is clamped between the platen 20 and the upper plate 28. The upper plate 28 is then rotated by the rotation means 37a and the desired shape of the doorlight is scored on the glass sheet, the shape being determined by the stylus 38 and copying mechanism 39 following the template 36 mounted on the shaft 37 carrying the upper plate 28. Fly-cuts may also be scored on the glass sheet using the scoring tool 41a. The speed of the upper plate 28 is determined by the template 40 and stylus 41.

After this operation the finger 18 on the index arm 16 again engages the vertical pin on the link 15 joining the two chassis at the transfer station, swings through an angle of 36°, retracts and returns to the datum position so that the platen carrying the scored sheet of glass is advanced to the breaking out station 4 where the platen 20 is once again engaged by a splined cone 26 and raised upwardly into a precisely located position. The splined cone may rotate the carrier and the glass in the precisely located position so that the sheet is brought into the angular position at which the operation is to be commenced. Glass within the scoreline is then freed from the marginal portions outside it by presenting the marginal portions 48 of the parent glass sheet 47 between the jaws 51 and 52 of three clamps 50 arranged in spaced relationship as shown in FIGURE 9, each clamp being arranged near to the leading end of the part of the score-line on which the clamp is operating. The parent glass sheet 47 is supported on a platen 20 and is secured thereto by suction. With the marginal portions 48 of the parent sheet of glass 47 received against the underside of the fixed jaws 52 of the clamps 50 air under pressure is supplied to the inlet 61 of each air cylinder 59 so that the piston 58 is actuated and as the jaw 51 moves clockwise under the marginal portion 48 of the glass sheet 47, the glass sheet is clamped at its marginal portions between the jaws 51 and 52.

Air under pressure is then supplied to the inlet 71 of the air cylinder 70 to move the piston 73 so that the block 74 mounted at the end of the piston 73 is forced from its datum position abutting the stop 78 to abut the stop 77 so that the carriage is swung through an arcuate path about the axis 67, the rollers 69 running along the arcuate guides 68 so that the apparatus assumes the position shown in FIGURE 7.

The operation of the three carriages and their associated clamps is a very rapid sequential operation so that the operation of the three clamps is almost simultaneous, but the clamps are actually operated in a predetermined sequence. For the sheet 47 shown in FIGURE 9 they are conveniently operated from left to right.

The movement of each of the carriages 62 through the arcuate path about the axis 67 opens the scoreline and causes the marginal portions 48 of the parent sheet of glass 47 to be bent outwardly and downwardly away from the area 45 within the scoreline so that the movement of the three clamps breaks out the glass sheet progressively along the scoreline 46 and fly-cuts 49 in one direction from one clamp 50 towards each succeeding clamp 50, and thereby produces the shaped sheet of glass 45 freed from the marginal portions 48 on its support platen 20.

Before the apparatus is reset for operation on a further sheet of glass, the waste portions of marginal glass 48 broken from the parent sheet of glass to obtain the final shaped sheet are released from between the jaws 51 and 52 by forcing air under pressure into the inlet 60 of the air cylinder 59 and fall on to an inclined slope beneath the jaws. The pieces of waste glass slide down the inclined slope and are removed continuously.

The apparatus may then be reset by forcing air under pressure into the inlet 72 of the air cylinder 70 so that the apparatus reassumes the position shown in FIGURE 5. A further sheet of glass may then be presented to the apparauts for breaking out. The waste marginal portion 48 of the glass will drop clear of the final shaped sheet without damaging it, because of the separating movement which occurs on account of the point of rotation of the clamp being below the lower surface of the glass.

The splined cone 26 is withdrawn from the platen 20 and the chassis is once again moved through an arc of 36° by the indexing arm 16 into the arrissing station. In the arrissing station another splined cone engages the platen and raises the platen 20 carrying the glass sheet towards an upper plate 28 so that the glass is located and clamped, and as the glass sheet is slowly rotated by the upper plate 28 an arrissing operation is similarly carried out on the edges of the glass sheet, using templates and styli as described for the cutting station, the stylus 38 in this case being of a diameter comparable with that of the grinding wheel.

The splined cone 26 is then withdrawn and the chassis advanced through an angle of 36° into the grinding station 6 where the platen is located and clamped as described above, and as the glass is slowly rotated by the upper plate 28 the edge of the glass sheet is ground, the rough grinder following a path determined by a template and stylus, as described above. After this operation, the chassis carrying the platen supporting the glass sheet is moved through 36° into the next grinding station 7 where the glass sheet is smooth ground in a similar manner to the rough grinding operation described above.

From the smooth grind station 7 the glass sheet is forwarded consecutively into two drilling stations where the glass sheet, located and clamped between the platen 20 and an upper plate 28, is moved angularly into position by the upper plate 28 and drilled by drills, after which the glass sheet is advanced into the transfer station 9. Here an arm is raised underneath the platen to engage the valve 24 in each platen 20 and release the vacuum in the cavity formed between the glass plate and the platen 20 so that the glass sheet is no longer secured by suction to the platen 20. The glass sheet is then raised by suction pads 42 on the transfer unit and transferred to the conveyor 43 which advances the glass sheet to the washing machine 44.

In the embodiment of the invention described each work station accommodates two chassis each carrying a glass sheet so that glass sheets are operated on simultaneously, and it will be appreciated that as the chassis move step by step endlessly around the circular track a continuous supply of glass sheets is converted into doorlights for automobiles ready for tempering.

Whilst the parent sheet of glass as described has three marginal portions removed, the apparatus according to this invention is particularly suited to producing and subsequently edge-working shaped sheets where all the marginal edges of the parent sheet have been removed.

It will be understood that whilst three breaking-out apparatus only are shown in FIGURE 9 removing three waste marginal pieces, more than one clamp may be used on one long edge if desired. Also by using four or more clamps, four marginal edges may be removed since none of the original edges of the parent glass are required for the purpose of locating the shaped glass sheet for subsequent operations.

I claim:

1. A method for operating on glass, for example cutting and edge working glass to produce glass sheets of desired shape and finish from respective parent sheets of glass, comprising the steps of securing each sheet of glass by suction in a desired position on a carrier ready for advancement, advancing each carrier with the glass sheet in the secured position through a series of operating stations in a step by step motion so that the glass sheet remains at each station for the respective operation to be effected, locating the carrier and the glass sheet precisely in an operating position wherein the glass is maintained while the glass remains at each station, and performing the allotted operation on the glass at each station.

2. A method according to claim 1 wherein the locating of the sheet of glass at each station is effected by raising the carrier and the glass sheet to the operating position in which the sheet of glass is precisely presented for the allotted operation to be performed on the glass at that station.

3. A method of operating on glass to produce glass sheets of desired shape from respective parent sheets of glass comprising the steps of locating a parent sheet of glass in a desired position ready for advancing by manoeuvring the parent sheet of glass into engagement with a set of positioning members which uniquely determine the precise position of the sheet of glass on a platen, securing the sheet of glass in the uniquely determined position on the platen by the application of suction through the platen, advancing the platen carrying the sheet of glass secured thereto through a series of operating stations in a step by step motion so that the glass sheet remains at each station for the respective operation to be effected, utilising a locating member to raise the platen at each station so that the platen and the glass sheet secured thereto are brought to a precise operating position, and performing the allotted operation on the glass while the glass is maintained in said precise operating position at each station.

4. Apparatus for conveying glass sheets through a closed series of treating stations arranged in a common circle, characterised by a series of chassis, an operating axis member coincident with the axis of the said common circle, a series of abutments carried by the series of chassis, a movable index arm mounted on the axis member for angular displacement thereon, said index arm having an effective length to engage the said abutments to actuate the individual chassis step by step through the the successive stations, and a circular track for the chassis permitting limited movement of the chassis around said common circle under control of said index arm.

5. Apparatus for conveying glass sheets through a closed series of equidistant treating stations arranged in a common circle characterised by a conveyor comprising an endless series of chassis articulated together on vertical axes arranged equidistant from an operating axis member coincident with the axis of the said common circle, a movable index arm mounted on the axis member for angular displacement thereon, individual abutments carried by each chassis at the leading end of each chassis, said index arm having an effective length to engage the said abutments to actuate the conveyor step by step through the successive stations, a circular track for the chassis permitting limited radial movement of the chassis and rigid connections between the adjacent chassis holding the conveyor in the desired path of movement on the track.

6. Apparatus for conveying glass sheets through a closed series of treating stations arranged in a common circle, characterised by a series of chassis, an operating axis member coincident with the axis of the said common circle, a series of abutments carried by the series of chassis, a movable index arm mounted on the axis member for angular displacement thereon, said index arm having an effective length to engage the said abutments to actuate the individual chassis step by step through the successive stations, a circular track for the chassis permitting movement of the chassis around said common circle under control of said index arm, platens carried respectively by said chassis, a locating member at each station arranged to lift a platen from a chassis to a precise operating position, a set of positioning members at a loading station for manoeuvring a sheet of glass into a uniquely determined position on the platen located in said precise operating position, and vacuum applying means connected to said platen at the loading station for applying suction to retain the glass sheet in said uniquely determined position on the platen ready for advancement in said uniquely determined position on the platen, when the chassis are advanced in said step by step movement through the successive stations.

7. A method of operating on flat glass, for example cutting or edge-working the glass to produce glass sheets of desired shape or finish from respective parent sheets of glass, comprising the steps of securing each sheet of glass by suction in a desired position on a carrier, advancing each carrier with the glass sheet in the secured position through a series of equidistant operating stations in a regular step by step motion so that the glass sheet remains at each station for a period for each respective operation to be completed, vertically locating the carrier and the glass sheet precisely in a horizontal plane related to the operating tool, at each station wherein the glass is maintained at least during the completion of the operation, and performing the allotted operation, on the glass at each station of the series.

8. A method as in claim 7 wherein the carrier and the glass are rotated at scoring and edge-finishing stations and the respective operations are performed on the glass while the glass is being rotated.

9. Apparatus for conveying glass sheets through a closed series of treating stations arranged in equidistant relationship along a circular path, comprising a circular track and linked chassis running on the track, characterised by rigid links connecting the chassis, an upstanding abutment maintained on each link, a horizontal index arm mounted on an axis member concentric with the track for angular excursion thereon, said arm in its datum position having an effective length to engage an abutment and then by angular movement advance the linked chassis along the track a distance to move a chassis from one station to the next in the direction of movement of the index arm, said index arm having a telescopic end whereby the arm is freed from the abutment to return to the datum position for the next excursion in engagement with the next trailing abutment, a vertically displaceable platen on each chassis, means for vertically displacing and setting the platen in a plane precisely related to the tools at each station, a peripheral sealing rim on the platen, and a biased valve on a suction line leading to the face of the platen displaceable to open the suction line when the glass rests on the valve whereby the glass is secured to the platen at each station.

10. Apparatus as in claim 9 wherein there is provided coplanar driving means at each station coaxial with the platen when presented thereat engaging the upper face of the platen when in operative setting.

11. Apparatus as in claim 9 wherein there is provided at each station a centering cone for raising the carrier and glass at said station into a precisely located position for presenting the glass to the operating tool at said station.

12. Apparatus, according to claim 9, comprising a plurality of movable fingers for operating on a part of the edge of a glass sheet, and a further plurality of opposed fingers resiliently mounted in a fixed position for engaging opposite edge parts of the glass sheet, whereby the parent glass sheet may be manoeuvred to a desired position on a chassis at the loading station in the series of treating stations.

13. Apparatus according to claim 9, comprising at one station an arm holding a scoring tool and a rotatable support for supporting the glass disposed directly under the scoring tool to avoid flexing of the glass under the pressure exerted by the scoring tool.

14. Apparatus according to claim 9, comprising at one station an arm holding a scoring tool and a rotatable support for supporting the glass disposed directly under the scoring tool to avoid flexing of the glass under the pressure exerted by the scoring tool, and at said one station an auxiliary scoring tool and rotatable support located near said auxiliary scoring tool, and operable during a part only of the period of treatment at said station.

15. Apparatus according to claim 9, wherein there are twice as many chassis as there are stations and the index arm engages the abutment between two linked chassis having similar settings of the platens so as to present two sheets of glass for identical operations at duplicated stations next to one another.

16. A method according to claim 8, wherein the parent glass sheet is scored at one station by a cutting tool to mark the outline of the final glass sheet and the surface of the glass opposite to the surface which is scored is supported directly opposite said cutting tool during the scoring of the glass to prevent flexing of the glass under pressure exerted by the scoring tool.

References Cited
UNITED STATES PATENTS

| | | | |
|---|---|---|---|
| Re. 25,886 | 10/1965 | Cargill | 29—200 |
| 2,595,172 | 4/1952 | Schenke | 58—91 |
| 2,659,950 | 11/1953 | West | 29—413 X |
| 2,881,516 | 4/1959 | Hull et al. | 29—407 |
| 2,968,866 | 1/1961 | Soper et al. | 29—417 |
| 3,143,792 | 8/1964 | Swanson et al. | 29—208 |
| 3,247,589 | 4/1966 | Burns | 29—424 |
| 3,254,400 | 6/1966 | Gordon | 29—413 |
| 3,359,773 | 12/1967 | Stuchberg | 72—325 |

THOMAS H. EAGER, Primary Examiner.

U.S. Cl. X.R.

29—208, 413; 65—62; 72—325